(12) United States Patent
Tanaka

(10) Patent No.: US 10,897,975 B2
(45) Date of Patent: Jan. 26, 2021

(54) COSMETIC APPLICATOR

(71) Applicant: SINWA CORPORATION, Yokohama (JP)

(72) Inventor: Akihiro Tanaka, Yokohama (JP)

(73) Assignee: Sinwa Corporation, Yokohama (JP)

( * ) Notice: Subject to any disclaimer, the term of this patent is extended or adjusted under 35 U.S.C. 154(b) by 259 days.

(21) Appl. No.: 15/992,251

(22) Filed: May 30, 2018

(65) Prior Publication Data
US 2018/0344009 A1    Dec. 6, 2018

(30) Foreign Application Priority Data

May 30, 2017    (JP) .................................. 2017-107128

(51) Int. Cl.
| | | |
|---|---|---|
| *A45D 34/04* | (2006.01) | |
| *A45D 40/26* | (2006.01) | |
| *F16F 1/04* | (2006.01) | |

(52) U.S. Cl.
CPC ......... *A45D 34/046* (2013.01); *A45D 40/265* (2013.01); *A45D 40/267* (2013.01); *F16F 1/04* (2013.01); *A46B 2200/1053* (2013.01)

(58) Field of Classification Search
CPC ...... A45D 34/04; A45D 34/06; A45D 34/046; A45D 34/041; A45D 34/042;
(Continued)

(56) References Cited

U.S. PATENT DOCUMENTS

| | | | | |
|---|---|---|---|---|
| 6,691,716 B2 * | 2/2004 | Neuner | ................ | A45D 40/267 132/218 |
| 7,810,509 B2 * | 10/2010 | Kuzuu | .................. | A46B 9/021 132/218 |

(Continued)

FOREIGN PATENT DOCUMENTS

| | | |
|---|---|---|
| JP | 2010-88532 A | 4/2010 |
| JP | 2011-136017 A | 7/2011 |

(Continued)

OTHER PUBLICATIONS

Applicant brings to the attention of the Examiner the existence of related U.S. Pat. App. No. 29613833, which was filed on Aug. 14, 2017, which was granted as U.S. Pat. No. D830628 on Oct. 9, 2018, and which has inventorship and/or ownership in common with the present application.

(Continued)

*Primary Examiner* — Rachel R Steitz
*Assistant Examiner* — Karim Asqiriba
(74) *Attorney, Agent, or Firm* — JTT Patent Services, LLC; Gerald T. Peters

(57) ABSTRACT

Provided is a cosmetic applicator having a coil spring at an applying portion thereof with which mascara may be easily applied to eyelashes. It is preferred that the coil spring not be exactly helicoidal, it being preferred that radial distance from the central axis to the outermost circumferential surface be made to vary as a function of angular position about the central axis. Variation in radial distance from the central axis to the outermost circumferential surface of the coil spring may occur in a repeating pattern of periodicity different from the pitch of the coil spring, causing coil spring shape element(s) to shift in angular position with each turn of the coil spring. Mascara may be held in spaces between adjacent coils, presence of bent portions which shift in the circumferential direction making it possible for the applying portion to easily retain mascara.

13 Claims, 6 Drawing Sheets

(58) Field of Classification Search
CPC .. A45D 34/043; A45D 34/045; A45D 40/262; A45D 40/20; A45D 40/205; A45D 40/265; A45D 26/0047; A45D 40/00; A45D 40/26; A45D 40/261; A45D 40/264; A45D 40/267; A45D 2040/0018; A45D 33/006; A45D 33/003; A45D 2200/10; A45D 2200/1009; A46B 9/06; A46B 9/10; A46B 3/02
USPC .......................................................... 132/317
See application file for complete search history.

(56) References Cited

U.S. PATENT DOCUMENTS

| | | | |
|---|---|---|---|
| D830,628 S | 10/2018 | Tanaka | |
| 2002/0014251 A1* | 2/2002 | Gueret | A45D 40/267 132/218 |
| 2008/0314403 A1* | 12/2008 | Rebours | A45D 40/262 132/218 |
| 2010/0310295 A1* | 12/2010 | Gueret | A45D 40/267 401/122 |
| 2014/0283868 A1* | 9/2014 | Zech | A46B 3/005 132/218 |

FOREIGN PATENT DOCUMENTS

| | | | |
|---|---|---|---|
| JP | 2012147837 | * | 8/2012 |
| WO | 2018/221246 A1 | | 12/2018 |

OTHER PUBLICATIONS

Applicant brings to the attention of the Examiner the fact that JP Des. Regn. App. No. 2017-005531 filed on Mar. 17, 2017, to which related U.S. Pat. No. 29613833 claims priority (see NPL Cite No. 1) and which has drawings similar in content to those of the present application, issued as JP Des. Regn. Cert. No. 1586792 on Sep. 1, 2017. Where necessary, note that that related U.S. Pat. No. 29613833 with serve in lieu of English translation of JP Des. Regn. App. No. 2017-005531.

Applicant brings to the attention of the Examiner the fact that JP Pat. App. No. 2017-107128, to which the present application claims priority, was filed on May 30, 2017 and issued as JP Pat. No. 6254317 B1 on Dec. 27, 2017. Note that JP Pat. App. No. 2017-107128, the priority document in the present application, has been retrieved via DAS.

Applicant brings to the attention of the Examiner the fact that Intl. App. No. PCT/JP2018/019124 filed on May 17, 2018, which designates the US and which published as WO 2018/221246 A1 on Dec. 6, 2018, is similar in content to JP Pat. App. No. 2017-107128, to which the present application claims priority (see NPL Cite No. 3). Where necessary, note that the present application with serve in lieu of English translation thereof.

International Search Report (ISR) dated Jul. 17, 2018 and International Preliminary Report on Patentability (IPRP) dated Dec. 3, 2019 in International Application No. PCT/JP2018/019124 filed on May 17, 2018, which published as WO 2018/221246 A1 on Dec. 6, 2018 (see NPL Cite Nos. 3 & 4).

* cited by examiner

FIG. 3A
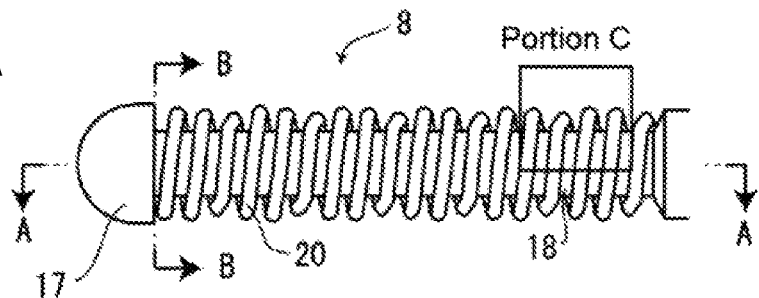
FIG. 3B
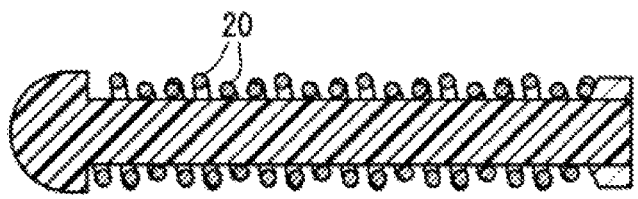
FIG. 3C
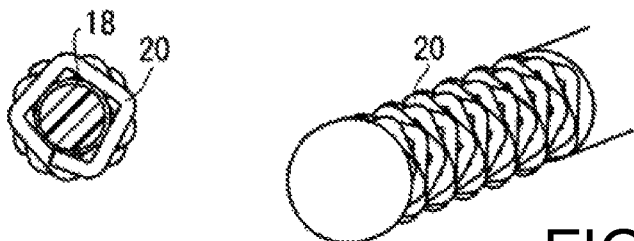
FIG. 3D
FIG. 3E
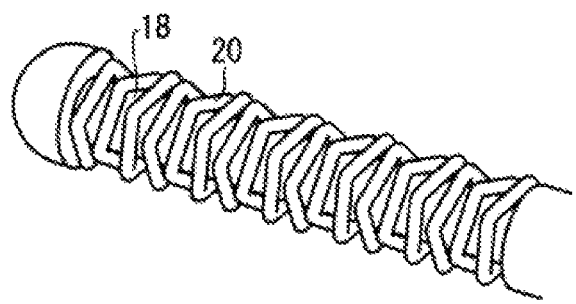

FIG. 7A 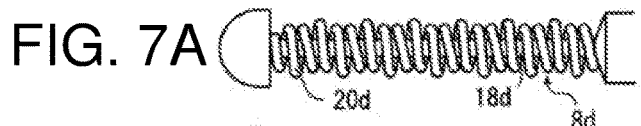  FIG. 7B
FIG. 7C  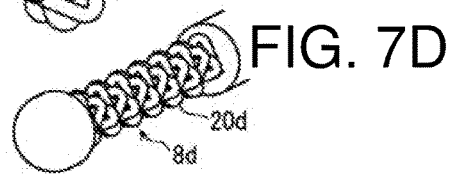 FIG. 7D
FIG. 8A  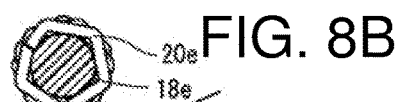 FIG. 8B
FIG. 8C 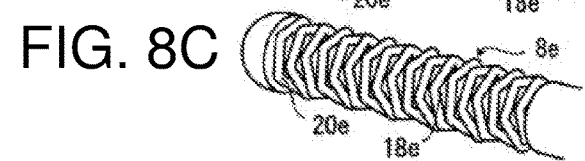 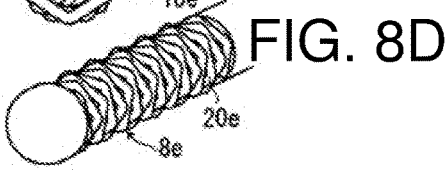 FIG. 8D
FIG. 9A 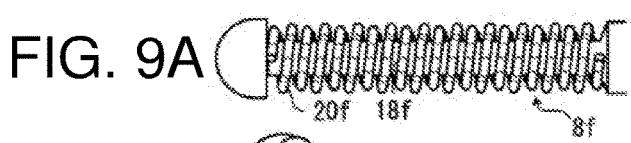  FIG. 9B
FIG. 9C  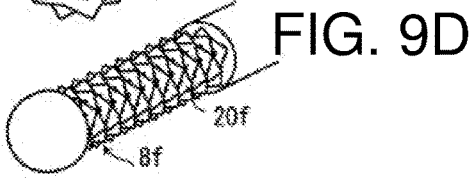 FIG. 9D
FIG. 10A   FIG. 10B
FIG. 10C 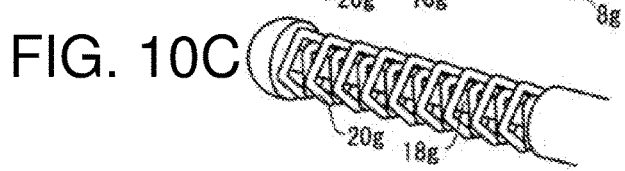  FIG. 10D
FIG. 11A  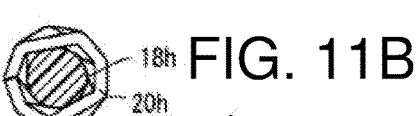 FIG. 11B
FIG. 11C 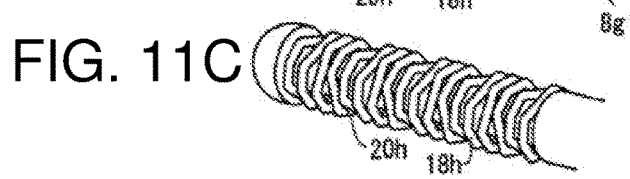 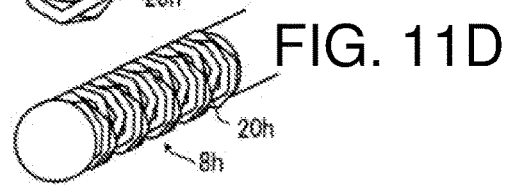 FIG. 11D

COSMETIC APPLICATOR

CROSS-REFERENCE TO RELATED APPLICATION, BENEFIT CLAIM, AND INCORPORATION BY REFERENCE

This application claims benefit of priority under 35 USC 119(a)-(d) to Japanese Patent Application No. 2017-107128, entitled "Cosmetic Applicator", filed 30 May 2017, the content of which is hereby incorporated herein in its entirety by reference.

FIELD OF THE INVENTION

The present invention relates to a cosmetic applicator to be used to apply a cosmetic such as mascara.

BACKGROUND

One type of cosmetic applicator which may be used to apply a cosmetic such as mascara to eyelashes employs a coil spring in an applying portion. As compared with the type of cosmetic applicator which employs bristles in the applying portion, a cosmetic applicator that employs a coil spring in the applying portion may be advantageous because there may be less risk that bristles will becomes detached therefrom and enter the eye.

On the other hand, as the coil spring slides easily, it is necessary that there be a shaft body at the center of the coil spring, and where the coil spring is closely wound around the shaft body, this may pose a problem in that the applying portion may not be able to hold a large amount of mascara.

Where there is the case, a space may be formed between the shaft body and the coil spring by causing cross-sectional shape of the coil spring and cross-sectional shape of the shaft body to be different from each other, permitting mascara to be held in the space therebetween.

However, where there is done, as the mascara held in the space between the shaft body and the coil spring will be located inside the coil spring, it may be difficult for mascara at such locations to touch the eyelashes, making application of mascara difficult. Furthermore, as it is mostly the mascara which is located between successive coils of the coil spring that is in practice actually applied to the eyelashes, increasing the pitch between spring coils in an attempt to increase the amount of mascara held therebetween may make it difficult to apply the mascara in such fashion that eyelashes are simultaneously individually and neatly combed.

There is therefore a need for a cosmetic applicator that employs a coil spring in the applying portion and that can easily apply mascara and easily comb eyelashes.

SUMMARY OF INVENTION

The present invention relates to a cosmetic applicator capable of being used to apply a cosmetic such as mascara or the like.

To address one or more of the needs described above, one aspect of the present invention provides a cosmetic applicator comprising applying portion(s).

In some embodiments, an applying portion may include a coil spring to apply mascara to eyelashes.

In some embodiments, the applying portion may further include a shaft body that is disposed at a center of the coil spring and that holds the coil spring.

In some embodiments, this may be such that there is a prescribed profile having a plurality of bent portions in a circumferential direction of the coil spring as observed from an axial direction of the coil spring, formed of a wire of the coil spring in approximately one pitch length that continues in the axial direction of the coil spring, shifts in increments of a prescribed angle in the coil spring circumferential direction as it advances in the coil spring axial direction.

Preferably, lengths of sides each of which is from a bent portion to a bent portion formed of the wire of the coil spring, and angles of respective bent portions formed of the wire of the coil spring as observed from the coil spring axial direction, are all the same.

Preferably, the applying portion is curved or inclined as a whole with respect to a central axis of the cosmetic applicator.

In one embodiment, the applying portion may comprise at least one coil spring. The at least one coil spring may have a length direction. The at least one coil spring may have a central axis in the length direction. The at least one coil spring may have an outermost circumferential surface. The at least one coil spring may have a pitch length that is a distance along the central axis between successive turns of the at least one coil spring.

In such an embodiment, the applying portion may further comprise at least one shaft body. The at least one shaft body may be disposed centrally within the at least one coil spring.

In such an embodiment, it may be that the at least one coil spring is not exactly helicoidal, radial distance from the central axis of the at least one coil spring to the outermost circumferential surface of the at least one coil spring being made to vary as a function of angular position about the central axis of the at least one coil spring for at least a portion in the length direction of the at least one coil spring.

In such an embodiment, the variation in distance from the central axis to the outermost circumferential surface may occur in a repeating pattern. Where this is the case, the repeating pattern of varying radial distance from the central axis to the outermost circumferential surface may be different from the pitch of the at least one coil spring.

In such an embodiment, difference in periodicity between the repeating pattern of varying radial distance from the central axis to the outermost circumferential surface and the pitch of the at least one coil spring, expressed as an angular amount by which an arc subtended by one complete iteration of the repeating pattern of varying radial distance differs from one 360° turn of the at least one coil spring, might be not greater than 90°.

In such an embodiment, difference in periodicity between the repeating pattern of varying radial distance from the central axis to the outermost circumferential surface and the pitch of the at least one coil spring, expressed as an angular amount by which an arc subtended by one complete iteration of the repeating pattern of varying radial distance differs from one 360° turn of the at least one coil spring, might be 5° to 45°.

In such an embodiment, difference in periodicity between the repeating pattern of varying radial distance from the central axis to the outermost circumferential surface and the pitch of the at least one coil spring, expressed as a difference between a length projected onto the central axis between corresponding locations in successive iterations of the repeating pattern of varying radial distance and the pitch length of the at least one coil spring, might be not greater than 250 μm.

In such an embodiment, difference in periodicity between the repeating pattern of varying radial distance from the central axis to the outermost circumferential surface and the pitch of the at least one coil spring, expressed as a difference between a length projected onto the central axis between corresponding locations in successive iterations of the repeating pattern of varying radial distance and the pitch length of the at least one coil spring, might be 14 μm to 125 μm.

In some embodiments, the repeating pattern of varying radial distance from the central axis to the outermost circumferential surface may describe a locus of at least one coil spring shape element comprising sides of mutually equal lengths and having mutually equal bending angles therebetween.

In some embodiments, the repeating pattern of varying radial distance from the central axis to the outermost circumferential surface may describe a locus of at least one coil spring shape element that is triangular as viewed along the central axis of the at least one coil spring.

In some embodiments, the repeating pattern of varying radial distance from the central axis to the outermost circumferential surface may describe a locus of at least one coil spring shape element that is pentagonal as viewed along the central axis of the at least one coil spring.

In some embodiments, the repeating pattern of varying radial distance from the central axis to the outermost circumferential surface may describe a locus of at least one coil spring shape element that is star-shaped as viewed along the central axis of the at least one coil spring.

In some embodiments, the repeating pattern of varying radial distance from the central axis to the outermost circumferential surface may alternately describe a locus of at least one first coil spring shape element and at least one second coil spring shape element, the second coil spring shape element being different from the first coil spring shape element, as viewed along the central axis of the at least one coil spring.

In some embodiments, the repeating pattern of varying radial distance from the central axis to the outermost circumferential surface may alternately describe a locus of at least one first polygonal coil spring shape element and at least one second polygonal coil spring shape element, number of sides of the second polygonal coil spring shape element being different from number of sides of the first polygonal coil spring shape element, as viewed along the central axis of the at least one coil spring.

In such an embodiment, the at least one first coil spring shape element may be triangular, and the at least one second coil spring shape element may be quadrilateral, as viewed along the central axis of the at least one coil spring.

One or more of the foregoing embodiments may make it possible for mascara or the like to adhere well to the coil spring, and for the coil spring to easily enter space(s) between eyelashes, and/or may make it possible for the coil spring to easily comb eyelashes.

Although the present invention is preferably applied for use with liquid mascara or other such liquid cosmetic, the present invention is not limited thereto, it also being possible to apply the present invention for use with mascara or other such cosmetic in solid, semi-solid, cake, cream, and/or other form.

BENEFIT OF INVENTION

An object of the present invention is to provide a cosmetic applicator that employs a coil spring in an applying portion, and easily applies mascara and easily combs eyelashes.

BRIEF DESCRIPTION OF DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

FIGS. 3A through 3E show an applying portion 8 of the cosmetic applicator 2 according to the first embodiment, FIG. 3A being a front view thereof, FIG. 3B being a sectional view thereof taken along section A-A indicated at FIG. 3A, FIG. 3C being a sectional view thereof taken along section B-B indicated at FIG. 3A, FIG. 3D being a perspective view thereof, and FIG. 3E being a perspective view thereof observed from a different angle.

FIGS. 7A through 7D show a first variation on applying portion 8, FIG. 7A showing a front view thereof, FIG. 7B showing an enlarged sectional view thereof in which the section is taken through a location corresponding to section B-B at FIG. 3A, FIG. 7C showing a perspective view thereof, and FIG. 7D showing a perspective view thereof observed from a different angle.

FIGS. 8A through 8D show a second variation on applying portion 8, FIG. 8A showing a front view thereof, FIG. 8B showing an enlarged sectional view thereof in which the section is taken through a location corresponding to section B-B at FIG. 3A, FIG. 8C showing a perspective view thereof, and FIG. 8D showing a perspective view thereof observed from a different angle.

FIGS. 9A through 9D show a third variation on applying portion 8, FIG. 9A showing a front view thereof, FIG. 9B showing an enlarged sectional view thereof in which the section is taken through a location corresponding to section B-B at FIG. 3A, FIG. 9C showing a perspective view thereof, and FIG. 9D showing a perspective view thereof observed from a different angle.

FIGS. 10A through 10D show a fourth variation on applying portion 8, FIG. 10A showing a front view thereof, FIG. 10B showing an enlarged sectional view thereof in which the section is taken through a location corresponding to section B-B at FIG. 3A, FIG. 10C showing a perspective view thereof, and FIG. 10D showing a perspective view thereof observed from a different angle.

FIGS. 11A through 11D show a fifth variation on applying portion 8, FIG. 11A showing a front view thereof, FIG. 11B showing an enlarged sectional view thereof in which the section is taken through a location corresponding to section B-B at FIG. 3A, FIG. 11C showing a perspective view thereof, and FIG. 11D showing a perspective view thereof observed from a different angle.

DETAILED DESCRIPTION

Hereinafter, preferred embodiments of a cosmetic applicator according to the present invention are described with reference to the drawings.

First Embodiment

Figure 1:
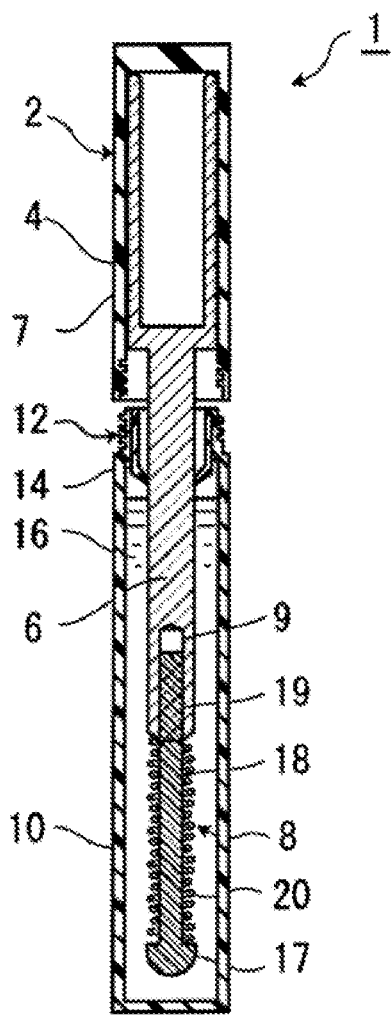
FIG. 1 is a sectional view of a mascara cosmetic product 1 showing an application example of a cosmetic applicator according to a first embodiment.
Figure 2:
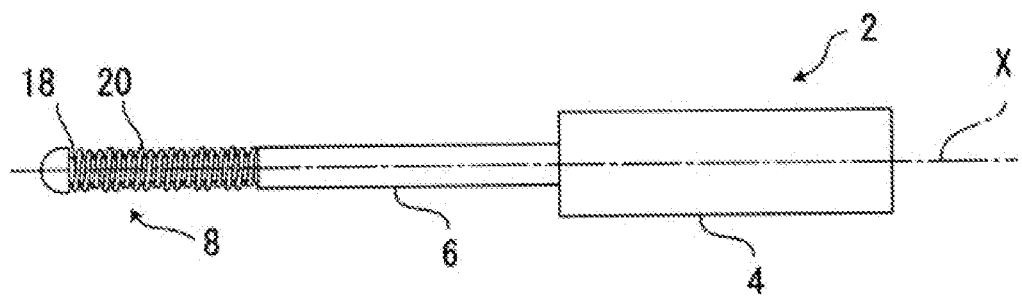
FIG. 2 is a front view of the cosmetic applicator 2 according to the first embodiment.

As shown in FIG. 1 and FIG. 2, a mascara cosmetic product 1 includes a mascara container 10 that contains mascara 16, and a cosmetic applicator 2 that can be mounted on a reduced-diameter portion 12 of the mascara container 10.

The cosmetic applicator 2 includes a cap 4, a base shaft 6, and an applying portion 8. The cap 4 is joined in integral fashion to a cylindrical base end portion 7 of increased diameter at the base shaft 6. A base shaft portion 19 of a shaft body 18 is engaged with a hole 9 provided in the base shaft 6, and the base shaft 6 and the applying portion 8 are formed in integral fashion with respect to each other.

The mascara container 10 is a bottomed cylinder having an upper end portion of reduced diameter, an opening being formed at the upper end of this reduced-diameter portion 12, a wiper 14 being press-fit within or otherwise secured to an inner circumferential surface thereof. A male thread is provided on an outer circumferential surface of the reduced-diameter portion 12, and a female thread is provided on a lower portion inner circumferential surface of the cap 4 to enable the cap 4 to be screwed to the reduced-diameter portion 12 of the mascara container 10. When the mascara container 10 and the cap 4 of the cosmetic applicator 2 are screwed to each other, the applying portion 8 is positioned slightly higher than the bottom portion of the mascara container 10. A wiper 14 disposed on an inner circumferential surface of the reduced-diameter portion 12 of the mascara container 10 is funnel-like in shape, the diameter thereof decreasing as one proceeds from the upper opening portion to the bottom portion thereof, and a free end at a lower portion thereof comes in wiping contact with the applying portion 8 so as to scrape off excessive mascara 16 adhering to the applying portion 8 when the cosmetic applicator 2 is pulled out of the mascara container 10.
Applying Portion As shown in FIGS. 3A through 3E, applying portion 8 includes coil spring 20 and shaft body 18 which is installed centrally within coil spring 20. Shaft body 18 which is centrally disposed within coil spring 20 suppresses sliding of coil spring 20 during application of mascara 16 to eyelashes. In the present embodiment, shaft body 18 is of columnar shape, and has, on a tip end thereof, a locking portion 17 projecting outward to prevent coil spring 20 from becoming detached therefrom. While the radius of shaft body 18 is chosen so as to be slightly smaller than the minimum inner diameter of coil spring 20 in the present embodiment so that the shaft body may be easily inserted centrally within coil spring 20 during assembly, there is no limitation with respect thereto, it being possible for the radius thereof to be chosen so as to be equal to or slightly larger than the minimum inner diameter of coil spring 20 if it is deemed desirable to firmly secure coil spring 20 thereto. In an embodiment in which the radius of shaft body 18 is chosen so as to be equal to or slightly larger than the minimum inner diameter of coil spring 20, it is preferred that each side (or vertex) of bent coil spring 20 come into contact with shaft body 18 at a single point so as to cause it to be firmly secured with respect thereto without the two being in close contact overall.

Figure 4:
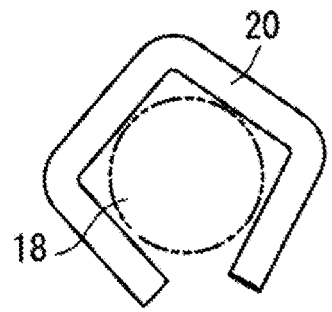
FIG. 4 is a view of a coil spring shape element of a coil spring 20 as seen from an axial direction.
Figure 5:
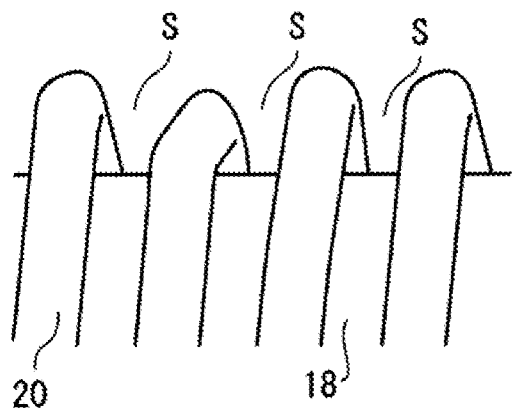
FIG. 5 is an enlarged view of portion C indicated at FIG. 3A.

With continued reference to FIGS. 3A through 3E and additional reference now to FIGS. 4 and 5, it is preferred as one proceeds along the central axis of coil spring 20 from one end thereof to the other that the locus described by coil spring 20, and in particular by the outermost circumferential surface of coil spring 20, as coil spring 20 coils circumferentially about its central axis in generally helical fashion, not be of constant radial distance from the central axis of that coil spring 20 but vary, e.g., in a repeating pattern.

For example, in a preferred embodiment, coil spring 20 is generally but not exactly helicoidal, distance from the central axis of coil spring 20 to the outermost circumferential surface of coil spring 20, i.e., the outer radius of coil spring 20, being made to vary in the circumferential direction with each turn of coil spring 20.

It is furthermore preferred that this circumferential variation in outer radius of coil spring 20 which preferably occurs as a function of axial position along the central axis of coil spring 20 occur in a repeating pattern, and it is moreover preferred that the periodicity, i.e., length of one period along the central axis of coil spring 20, with which this pattern of circumferential variation in the magnitude of the outer radius of coil spring 20 be different from the periodicity, or pitch, with which coil spring 20 is wound (i.e., distance along the central axis of coil spring 20 between successive turns of coil spring 20).

For example, in the embodiment shown at FIGS. 3A through 5, coil spring 20 in its overall aspect is generally helicoidal, the outer radius thereof approximating the locus of a helix. However, when looked at more closely, it is seen that coil spring 20 in the embodiment shown in FIGS. 3A through 5 is not perfectly helicoidal, and the outer radius thereof does not exactly describe the locus of a helix. Rather, in the embodiment shown in FIGS. 3A through 5, coil spring 20 is bent at various locations; i.e., is made to describe a locus which is other than that of the overall generally helicoidal profile of coil spring 20.

Furthermore, in the embodiment shown in FIGS. 3A through 5, the periodicity of this pattern of bends, i.e., the distance projected onto the central axis of coil spring 20 between corresponding locations in successive iterations of the pattern of bends in coil spring 20, is different from the pitch or periodicity of coil windings, i.e., the distance projected onto the central axis of coil spring 20 between corresponding locations in successive 360° turns of the overall generally helicoidal profile of coil spring 20.

More specifically, coil spring 20 in the embodiment shown in FIGS. 3A through 5 is such that a prescribed repeating geometric pattern (hereinafter "coil spring shape element") which is the locus described by coil spring 20 as it makes approximately but not exactly one turn, i.e., the three-dimensional shape (or the two-dimensional shape thereof as seen end-on in axial view) traced by coil spring 20 as the projection thereof onto the central axis of coil spring 20 is made to advance or retreat by approximately but not exactly one pitch length of coil spring 20, is continuously repeated as one proceeds along the axial direction of coil spring 20, but in doing so this repeating geometric pattern or coil spring shape element is rotationally shifted by a prescribed angle with each turn of coil spring 20 in the circumferential direction, i.e., with each change in travel along the central axis of coil spring 20 corresponding to one pitch length of coil spring 20.

Where it is said "approximately but not exactly" one turn of coil spring 20, and where it is said "approximately but not exactly" one pitch length of coil spring 20, this means that the arc subtended in the circumferential direction by the geometric pattern or coil spring shape element is not exactly 360° but is either less than 360° or greater than 360°.

That is, while there is no objection to employment of an embodiment in which such a prescribed geometric pattern or coil spring shape element repeats with each exactly one turn) (360°, i.e., with each exactly one pitch length, of coil spring 20, it is preferred as shown in FIG. 4 that the repeating geometric pattern or coil spring shape element of coil spring 20 subtend an arc in the circumferential direction that is less than or greater than 360° (the situation in which this is less than 360° being shown in FIG. 4), so that as one advances along the axial direction of coil spring 20 this difference relative to 360° is manifested as a progressive shift of the repeating geometric pattern or coil spring shape element by a prescribed angle in the circumferential direction.

In the example shown in FIG. 4, this repeating geometric pattern or coil spring shape element comprises sides of the same length and having the same bending angle therebetween, coil spring 20 being such that as this coil spring shape element comprising sides of identical length, with identical bending angles therebetween, is repeated, it is made to shift about rotationally in the circumferential direction, and the coil spring is wound with uniform pitch between successive coils. Coil spring 20 of the present embodiment might, for example, be made to have generally helicoidal shape overall by causing the wire that makes up coil spring 20 to be bent at regular intervals in such fashion as to produce a repeating geometric pattern having sides of identical length, with identical bending angles therebetween, that is rotationally shifted with each turn in the circumferential direction as one progresses along the axial direction of coil spring 20. This being the case, bent portions of adjacent coils that are one turn, i.e., one pitch length, apart in the axial direction of coil spring 20 do not appear at the same position in the circumferential direction but are rotationally shifted by a prescribed angle from each other. As coil spring 20 of the present embodiment is secured in such fashion as to cause it to exert a restoring force on the bearing surfaces that support it, there is reduced tendency for coil spring 20 of the present embodiment to rotate.

Benefit of First Embodiment

In the embodiment shown in FIG. 5, mascara 6 is retained primarily in the spaces S between adjacent coils, from where it is applied. Mascara 6 retained in these spaces S faces the outer circumference, so that the mascara easily touches the eyelashes.

In accordance with the present embodiment, a prescribed shape element of coil spring 20 corresponding to approximately one pitch length in the axial direction may be made to shift in increments of a prescribed angle in the circumferential direction as one progresses along the axial direction, so that vertices of bends in adjacent coils respectively one turn apart shift by a prescribed angle from each other in the circumferential direction. A difference in level is produced in correspondence to the shift between vertices, this difference in level permitting mascara 16 to be more easily retained. Furthermore, as a result of this level difference, eyelashes may more easily enter spaces S, permitting the mascara to easily touch the eyelashes. Furthermore, because coil spring 20 is not in close overall contact with shaft body 18, this permits increase in the outer diameter of the coil spring, ensuring that there is sufficient height for use as a comb, as a result of which the coil spring is shaped so as to easily comb eyelashes. Since the mascara 16 is retained in portions that eyelashes easily enter, the mascara 16 is easily applied, and eyelashes are easily combed while the mascara is applied thereto.

The coil spring 20 of the present embodiment has a shape element which is formed by bending the wire from which coil spring 20 is formed in such fashion that lengths of sides and bending angles are respectively equal to each other, and while the positions of bent portions in the circumferential direction are made to shift by a prescribed angle in the circumferential direction with every turn of coil spring 20, because this shift is regular, those bent portions have a more or less uniform appearance on the outer circumference of the applying portion 8.

Much mascara 16 is retained between successive coils in the axial direction at locations where bent portions of adjacent coils are different in level, and the mascara 16 held between successive coils is easily applied. Since coil spring 20 of the present embodiment has bent portions over the entire length thereof, and since in the present embodiment a bent portion in one coil does not appear at the same position as a bent portion of an adjacent coil in the axial direction but rather is made to shift in the circumferential direction, mascara 16 can be retained between bent portions of adjacent coils. At applying portion 8 of the present embodiment in which coil bent portions shift from each other over the entirety thereof, mascara 16 can be retained more or less uniformly overall. In a preferred embodiment, there will therefore be little or no unevenness in the amount of mascara 16 that is retained by the applying portion 8, as a result of which mascara 16 can be evenly applied to eyelashes. Furthermore, in such an embodiment, it will be possible for the coil spring to easily touch the eyelashes and easily apply mascara thereto, so that excellent usability is achieved.

Second Embodiment

Figure 6A:
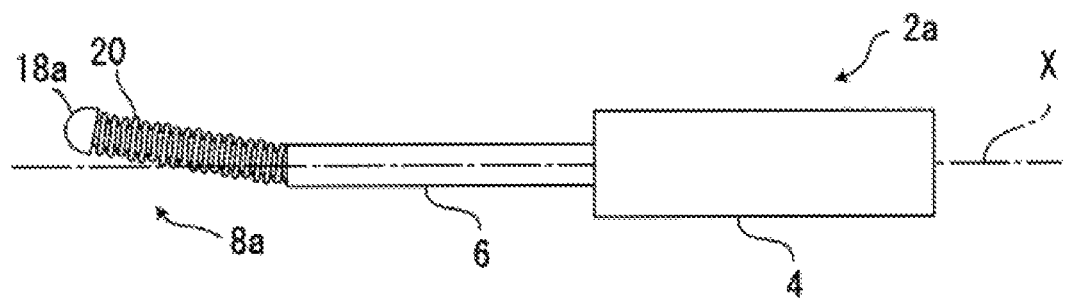
FIGS. 6A through 6C show front views of a cosmetic applicator according to a second embodiment, FIG. 6A showing a situation in which an applying portion is inclined, FIG. 6B showing a situation in which the applying portion is curved, and FIG. 6C showing a situation in which the applying portion is curved backward.
Figure 6B:
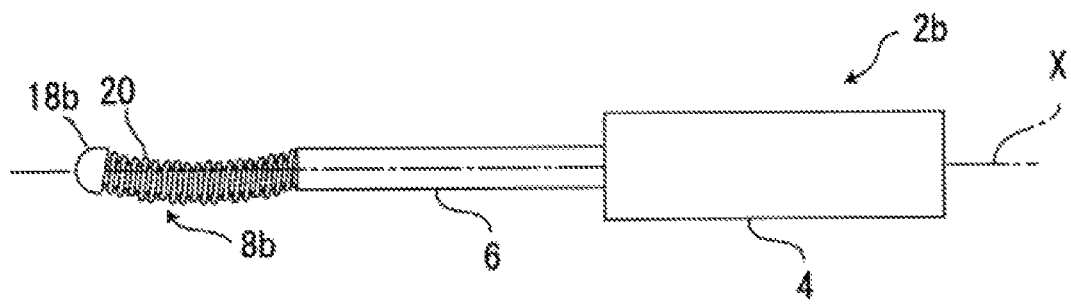
Figure 6C:
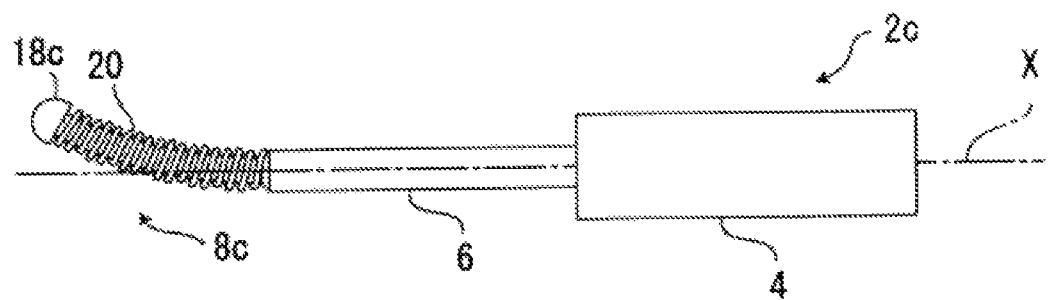

FIGS. 6A through 6C show cosmetic applicators 2a, 2b, and 2c according to a second embodiment. Cosmetic applicators 2a, 2b, and 2c respectively shown at FIGS. 6A, 6B, and 6C respectively have applying portions 8a, 8b, and 8c that are different in shape from that of the first embodiment.

At cosmetic applicator 2a shown at FIG. 6A, shaft body 18a of applying portion 8a is inclined with respect to the central axis X of the cosmetic applicator. The coil spring 20 is also held along the shaft body 18a, and the applying portion 8a is inclined as a whole with respect to the central axis X.

At cosmetic applicator 2b shown at FIG. 6B, shaft body 18b of applying portion 8b is curved with respect to the central axis X. The coil spring 20 is also held along the shaft body 18b, so that the applying portion 8b is curved as a whole.

Similarly, at cosmetic applicator 2c shown at FIG. 6C, shaft body 18c of applying portion 8c is curved backward with respect to the central axis X, and the coil spring 20 also deforms along the shaft body 18.

Accordingly, applying portions 8a, 8b, and 8c are capable of coming into close contact with eyelashes, as a result of which it will be easy to apply mascara to eyelashes. Because coil spring 20 can flexibly deform since it is a spring, even where shaft body 18 is made to have a different shape, the coil spring is able to deform in such fashion as to follow the shape and be held in place thereby. Therefore, the number of components to be newly created when manufacturing a variation on cosmetic applicator 2 in which the shape of the applying portion 8 is varied is reduced, permitting reduction in manufacturing cost.

Variations

While the invention has been described above in terms of specific embodiments, the present invention is not limited thereto, it being possible to carry out various modifications and variations.

For example, at coil spring 20, the coil spring shape element is repeated in the circumferential direction as one progresses along the axial direction, it being sufficient that the arc subtended in the circumferential direction by the coil spring shape element be not exactly 360° but instead be either less than 360° or greater than 360°. The amount of this angular difference from 360° (one turn of the coil spring) is the angular shift in the coil spring shape element in the circumferential direction for every one pitch length that one progresses along the axial direction. This angular difference is preferably not more than 90°, and more preferably 5° to 45°. Or expressed as the difference between the pitch length of coil spring 20 and the length in the axial direction of one coil spring shape element, i.e., the length projected onto the central axis of coil spring 20 between corresponding locations in successive iterations of the repeating pattern of varying radial distance from the central axis to the outermost circumferential surface of coil spring 20, this linear difference projected onto the central axis of coil spring 20 is preferably not more than 250 µm, and is more preferably 14 µm to 125 µm.

As shown in FIGS. 7A through 11D, many variations are possible on coil spring 20 of applying portion 8. The coil spring shape elements of coil springs 20d, 20e, and 20f at FIGS. 7A through 9D are such that coil spring 20d has a coil spring shape element which is approximately triangular, coil spring 20e has a coil spring shape element which is approximately pentagonal, and coil spring 20f has a coil spring shape element which is in the shape of a star. In this way, the coil spring shape element may be a polygonal shape which is, for example, approximately triangular, approximately pentagonal, or in the shape of a star, as seen along the axial direction.

As another example, coil spring 20g shown in FIGS. 10A through 10D has a shape in which an approximately triangular shape element and an approximately quadrilateral shape element alternate with every approximately one pitch length.

At coil spring 20h shown in FIGS. 11A through 11D, the lengths of the sides making up the shape element corresponding to one pitch length, and the bending angles therebetween, are not equal to each other. At coil spring 20h, the shape element continues while shifting in increments of a prescribed angle in the circumferential direction as one advances along the axial direction. Thus, unlike coil springs of other embodiments, at coil spring 20h, the same shape element need not be repeated in the circumferential direction, it being sufficient that at least some bent portion(s) at adjacent coils one pitch length apart be made to shift relative to each other in the circumferential direction. Due to the shift between bent portions of adjacent coils, the mascara 16 is made to more easily touch the eyelashes, and the eyelashes are more easily combed than would be the case were the same shape element to be continuously present.

While shaft bodies 18d, 18e, 18f, 18g, and 18h would preferably have respectively different outer diameters to accommodate the respectively different inner diameters of coil springs 20d, 20e, 20f, 20g, and 20h, note that they may all be of the same common outer diameter.

The cross-sectional shape of the wire employed at coil spring 20 is not limited to circular, but may be rectangular, polygonal, oval, or the like. Coil spring 20 need not be made of metal but may be formed from resin and/or other such suitable material.

Figure 12A:
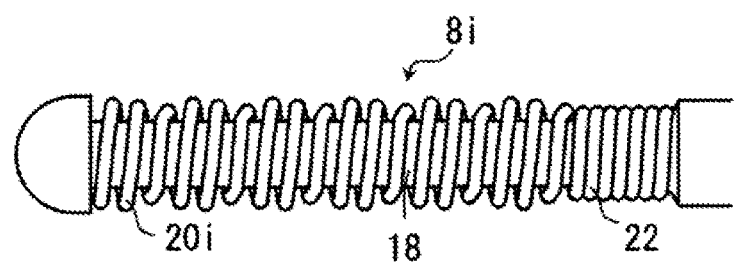
FIG. 12A shows a front view of a sixth variation on applying portion 8.

As shown at FIG. 12A, an end portion 22 that is in close contact with the shaft body 18 may be provided as indicated at coil spring 20i to suppress rotation of coil spring 20i and cause the coil spring to be easily held by shaft body 18.

Any of various measures may be employed to firmly secure coil spring 20 to shaft body 18; for example, end portion 22 may be set within base shaft 6 and punched, a turnback may be provided on shaft body 18 to prevent the coil spring 20 from moving, and/or a hole through which an end of the coil spring 20 is inserted may be provided on base shaft 6 or shaft body 18.

Figure 12B:
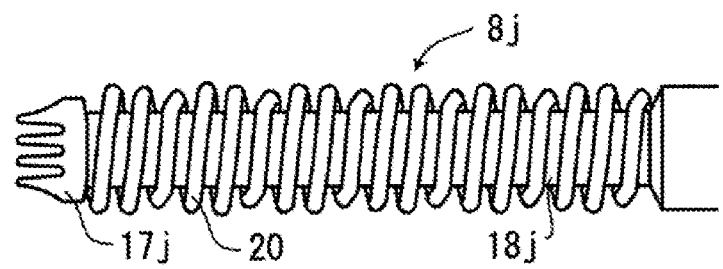
FIG. 12B shows a front view of a seventh variation on applying portion 8.

As indicated at locking portion 17j shown at FIG. 12B, locking portion 17 may be formed into a comb that can be used to comb eyelashes.

While embodiments of the present invention have been described above, modes of carrying out the present invention are not limited to the foregoing embodiments, a great many further variations being possible without departing from the gist of the present invention. For any of the various function(s) described with reference to the attached drawings, so long as it would not interfere with ability to carry out the function(s) in question, the order of steps may be different from that described herein.

EXPLANATION OF REFERENCE NUMERALS

| | |
|---|---|
| 1 | Mascara cosmetic product |
| 2, 2a, 2b | Cosmetic applicator |
| 4 | Cap |
| 6 | Base shaft |
| 7 | Cylindrical portion (of base shaft) |
| 9 | Hole (of base shaft) |
| 8, 8a, 8b, 8c, 8d, 8e, 8f, 8g, 8h, 8i, 8j | Applying portion |
| 10 | Mascara container |
| 12 | Reduced-diameter portion (of mascara container) |
| 14 | Wiper |
| 16 | Mascara |
| 17, 17j | Locking portion |
| 18, 18a, 18b, 18c, 18d, 18e, 18f, 18g, 18h, 18j | Shaft body |
| 19 | Base shaft portion (of core wire portion) |
| 20, 20c, 20d, 20e, 20f, 20g, 20h, 20i | Coil spring |
| 22 | End portion |
| S | Space |
| X | Central axis (of cosmetic applicator) |

The invention claimed is:

1. A cosmetic applicator having an applying portion for applying cosmetic, the applying portion comprising:
   at least one coil spring having a length direction, a central axis in the length direction, an outermost circumferential surface, and a pitch length that is a distance along the central axis between successive turns of the at least one coil spring; and
   at least one shaft body disposed centrally within the at least one coil spring;
   wherein the at least one coil spring deviates from helicoidal at least inasmuch as radial distance from the central axis of the at least one coil spring to the outermost circumferential surface of the at least one coil spring is made to vary as a function of angular position about the central axis of the at least one coil spring for at least a portion in the length direction of the at least one coil spring; and wherein the variation in distance from the central axis to the outermost circumferential surface occurs in a repeating pattern in which bent portions alternate with nonbent portions as viewed along an axial direction of the coil spring.

2. The cosmetic applicator according to claim 1 in which periodicity of the repeating pattern of varying radial distance from the central axis to the outermost circumferential surface is different from the pitch of the at least one coil spring.

3. The cosmetic applicator according to claim 2 in which difference in periodicity between the repeating pattern of varying radial distance from the central axis to the outermost circumferential surface and the pitch of the at least one coil spring, expressed as an angular amount by which an arc subtended by one complete iteration of the repeating pattern of varying radial distance differs from one 360° turn of the at least one coil spring, is not greater than 90°.

4. The cosmetic applicator according to claim 2 in which difference in periodicity between the repeating pattern of varying radial distance from the central axis to the outermost circumferential surface and the pitch of the at least one coil spring, expressed as an angular amount by which an arc subtended by one complete iteration of the repeating pattern of varying radial distance differs from one 360° turn of the at least one coil spring, is 5° to 45°.

5. The cosmetic applicator according to claim 2 in which difference in periodicity between the repeating pattern of varying radial distance from the central axis to the outermost circumferential surface and the pitch of the at least one coil spring, expressed as a difference between a length projected onto the central axis between corresponding locations in successive iterations of the repeating pattern of varying radial distance and the pitch length of the at least one coil spring, is not greater than 250 µm.

6. The cosmetic applicator according to claim 2 in which difference in periodicity between the repeating pattern of varying radial distance from the central axis to the outermost circumferential surface and the pitch of the at least one coil spring, expressed as a difference between a length projected onto the central axis between corresponding locations in successive iterations of the repeating pattern of varying radial distance and the pitch length of the at least one coil spring, is 14 µm to 125 µm.

7. The cosmetic applicator according to claim 2 in which the repeating pattern of varying radial distance from the central axis to the outermost circumferential surface describes a locus of at least one coil spring shape element comprising sides of mutually equal lengths and having mutually equal bending angles therebetween.

8. The cosmetic applicator according to claim 2 in which the repeating pattern of varying radial distance from the central axis to the outermost circumferential surface describes a locus of at least one coil spring shape element that is triangular as viewed along the central axis of the at least one coil spring.

9. The cosmetic applicator according to claim 2 in which the repeating pattern of varying radial distance from the central axis to the outermost circumferential surface describes a locus of at least one coil spring shape element that is pentagonal as viewed along the central axis of the at least one coil spring.

10. The cosmetic applicator according to claim 2 in which the repeating pattern of varying radial distance from the central axis to the outermost circumferential surface describes a locus of at least one coil spring shape element that is star-shaped as viewed along the central axis of the at least one coil spring.

11. The cosmetic applicator according to claim 2 in which the repeating pattern of varying radial distance from the central axis to the outermost circumferential surface alternately describes a locus of at least one first shape element and at least one second shape element, the second shape element being different from the first shape element, as viewed along the central axis of the at least one coil spring.

12. The cosmetic applicator according to claim 2 in which the repeating pattern of varying radial distance from the central axis to the outermost circumferential surface alternately describes a locus of at least one first polygonal shape element and at least one second polygonal shape element, number of sides of the second polygonal shape element being different from number of sides of the first polygonal shape element, as viewed along the central axis of the at least one coil spring.

13. The cosmetic applicator according to claim 12 in which the at least one first shape element is triangular, and the at least one second shape element is quadrilateral, as viewed along the central axis of the at least one coil spring.

* * * * *